United States Patent [19]

Nakatsu

[11] 4,394,568
[45] Jul. 19, 1983

[54] CARD READING APPARATUS

[75] Inventor: Yoshinobu Nakatsu, Hadano, Japan

[73] Assignee: Hitachi, Ltd., Tokyo, Japan

[21] Appl. No.: 294,054

[22] Filed: Aug. 18, 1981

[30] Foreign Application Priority Data

Sep. 5, 1980 [JP] Japan ................................ 55/122406

[51] Int. Cl.³ .......................... G06K 13/00; B65H 1/10
[52] U.S. Cl. ...................................... 235/475; 235/476;
235/481; 271/165; 271/259
[58] Field of Search ........................ 235/475, 470, 486;
271/110, 111, 160, 165, 166, 259

[56] References Cited

U.S. PATENT DOCUMENTS 4,039,180 8/1977 Stocker ................................ 271/110

*Primary Examiner*—Harold I. Pitts
*Attorney, Agent, or Firm*—Antonelli, Terry & Wands

[57] ABSTRACT

A card reading apparatus having a hopper in which cards bearing digital information such as punched cards or marked cards are accommodated, a card drive unit for feeding the cards from the hopper and a reading station for reading the information recorded on the cards is disclosed. The hopper is provided with a first switch for detecting the presence or absence of the card and a second switch for detecting the presence or absence of a card weight. Different instructions are given to the card drive unit in accordance with the transition of the status of the first and second switches to feed the cards in the hopper to the reading station in different modes.

4 Claims, 8 Drawing Figures

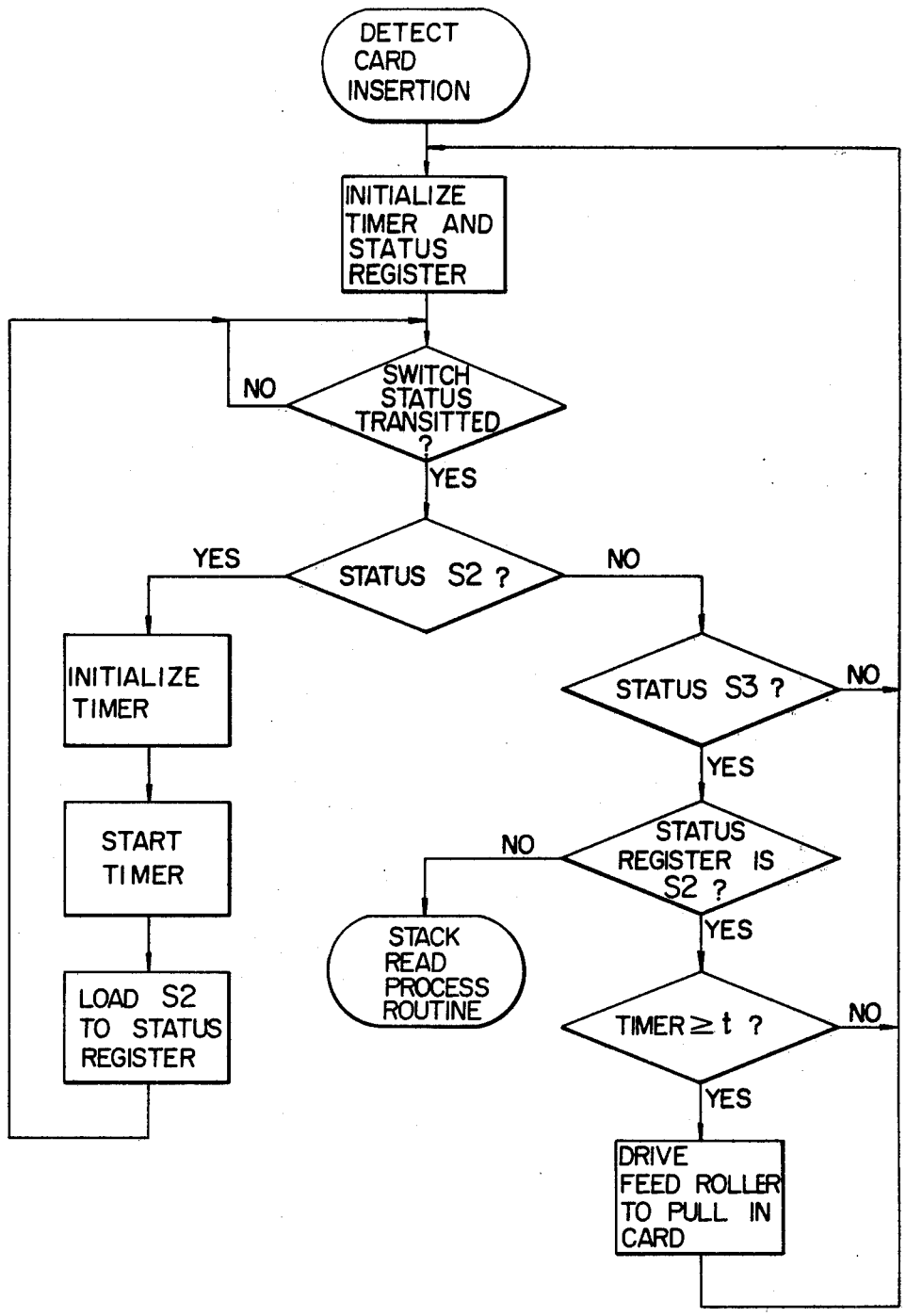

CARD READING APPARATUS

BACKGROUND OF THE INVENTION

The present invention relates to a card reading apparatus, and more particularly to an improvement in a feed mode of cards accommodated or inserted in a hopper.

A card reading apparatus for reading a card bearing digital information such as a punched card, a marked card or a marked sheet usually comprises a hopper, a reading station and a stacker. The cards are accommodated or inserted in the hopper. A card weight is disposed on the card stack. The cards in the hopper are fed to the reading station. The reading station usually reads digital holes or marks by optical means. The cards read at the reading station are fed to the stacker where they are accommodated.

In one prior art method for feeding the card from the hopper to the reading station in such a card reading apparatus, a start switch is provided to start the card feed operation and a sequential read mode in which the cards stacked in the hopper are fed to the reading station sequentially one at a time by the depression of the switch and a signal card read mode in which one of the cards in the hopper is fed to the reading station for each depression of the switch are used to select the card feed mode in order to enhance the operability. In the signal card read mode, a first type of operation for feeding one card from the stack of cards in the hopper to the reading station for each depression of the start switch and a second type of operation in which an operator inserts a card to the hopper as required and the inserted card is fed to the reading station may be required. The first type of operation is effective when it is desired to read the cards stacked in the hopper one at a time. The second type of operation is effective when the frequency of occurrence of data to be read by the card reading apparatus is sporadically or the data having time restriction in the reading operation is to be read.

However, in such a card operation, the start switch has to be depressed each time when the card is to be read and the card weight has to be set on the card stack in the hopper. Thus, the operability is very poor. Furthermore, in a certain prior art card reading apparatus, even if the start switch is depressed to feed the card and rotate a card feed motor, the rotation of the motor is stopped unless the card is inserted in the hopper within a predetermined time period. Thus, the operability is much more poor.

SUMMARY OF THE INVENTION

It is, therefore, an object of the present invention to provide a card feed apparatus having an improved operability which is adaptable to various types of feed operations such as the feed of cards accommodated in a hopper or the feed of cards inserted in the hopper.

It is another object of the present invention to provide a card reading apparatus which can automatically set a card feed mode or a card read mode by detecting the presence or absence of the cards in the hopper and the presence or absence of the card weight.

The present invention is realized in a card reading apparatus which comprises a hopper in which cards are stacked or, inserted, a card drive which is actuated to feed the cards to a reading station and the reading station to read information recorded on the fed cards.

In accordance with the present invention, the hopper in which the cards are stacked or inserted is provided with a first switch for detecting the presence or absence of the card weight for pressing the cards and a second switch for detecting the presence or absence of the cards. Memory means for storing status of the weight and the card detected by the first and second switches is also provided. A processor for determining a one card out of the stack read mode or a single inserted card read mode based on the previous of the weight and the card stored in the memory means and current status of the weight, and the card is further provided. The card drive is controlled by a mode control signal from the processor to feed the cards to the reading station.

According to the present invention, the presence or absence of the card weight and the card is detected and the cards are fed to the reading station under different modes in response to the transfer between the status. Thus, the operability of the card reading apparatus is improved.

BRIEF DESCRIPTION OF THE DRAWINGS

FIG. 4 shows a flow chart for explaining the operation of the embodiment.

DESCRIPTION OF THE PREFERRED EMBODIMENTS

Figure 1:
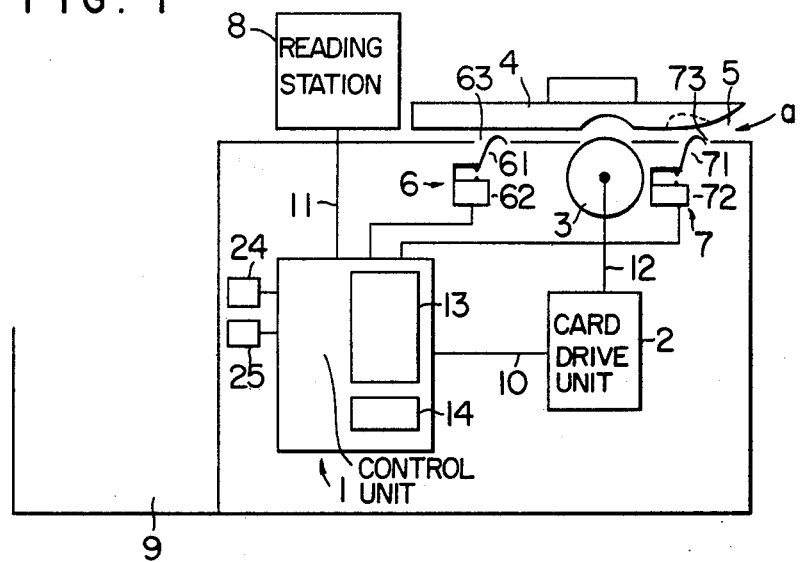
FIG. 1 shows a schematic diagram of a card reading apparatus in accordance with one embodiment of the present invention.

Referring to the drawings, one embodiment of the present invention is explained in detail. Referring to FIG. 1, cards are stacked or inserted in a hopper 5. When a number of cards are stacked in the hopper 5, a card weight 4 is disposed on the card stack. The card weight 4 has a function of a weight to press the cards to a feed roller 3. In FIG. 1, the card weight 4 is set without card. The card weight 4 has recesses at positions which face the feed roller 3 and an actuator 71 of a card detection switch 7 to be described later.

A weight detection switch 6 and the card detection switch 7 are mounted on a bottom of the hopper 5. The weight detection switch 6 detects the presence or absence of the card weight 4 and comprises an actuator 61 projecting from a hole 63 and a microswitch 62 for producing an electrical signal when a contact thereof is opened or closed by the actuation of the actuator 61. When the card weight 4 is set in the hopper 5, the bottom of the weight 4 depresses the actuator 61 to close the contact of the switch so that the electrical signal is produced to detect the setting of the card weight 4. The card weight detection signal is sent to a control unit 1. When the cards are stacked in the hopper 5 over the switch 6 and the card weight 4 is disposed on the card stack, the weight detection switch 6, in effect, detects the stacked card.

The card detection switch 7 detects the presence or absence of the cards and it comprises an actuator 71 projecting from a hole 73 and a microswitch 72. When the cards are stocked in the hopper 5, or when a card is inserted into a gap between the card weight 4 and the bottom of the hopper 5 in the direction of a arrow a, the card detection switch 7 is turned on to detect the presence or absence of the card. The card detection signal is sent to the control unit 1. A portion of the feed roller 3 projects into the hopper 5 and the feed roller 3 is driven by a card drive unit 2 through a drive line 12.

The information recorded on the cards intermittently fed from the hopper 5 one at a time are read at a reading station 8. The reading station 8 has a known optical read means to optically read punched holes or digital marks, and photo-electric converted signals are sent to the control unit 1.

A stacker 9 accommodates the cards read at the reading station 8. The card drive unit 2 receives a control signal from the control unit 1 through an instruction line 10 so that it drives a motor to rotate the feed roller 3. As will be described later, the present invention changes the control signal fed to the card drive unit 2 in accordance with a selected mode.

Figure 2:
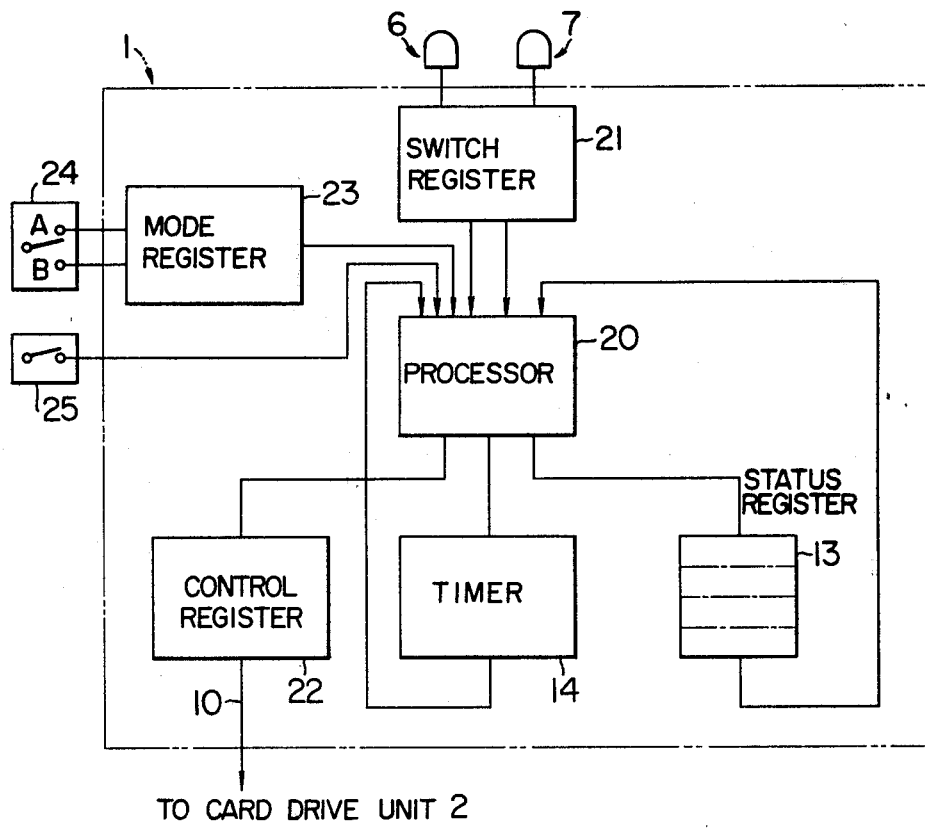
FIG. 2 shows a control block diagram of FIG. 1.

Referring now to FIG. 2, the detail of the control unit 1 is explained. The signals from the weight detection switch 6 and the card detection switch 7 are temporarily loaded to a switch register 21 and the content of the register 21 is subsequently sent to a micro-processor (hereinafter simply referred to as a processor) 20. Signals from a mode switch 24 and a start switch 25 are also applied to the processor 20. The mode switch 24 selects a sequential read mode or a single card read mode. For example, when a terminal A is selected the sequential read mode is selected, and when a terminal B is selected the single card read mode is selected. The mode signal is temporarily loaded to a mode register 23 and thence sent to the processor 20. The sequential read mode refers to a mode in which a number of cards are stacked in the hopper 5 and the cards are sequentially read in sequence. The single card read mode refers to a mode in which a number of cards stacked in the hopper 5 are sequentially fed to the reading station 8 each time when the start switch 25 is depressed (one card out of stack read mode) and a mode in which cards are inserted one at a time while the card weight 4 is disposed in the hopper 5 and the inserted card is fed to the reading station 8 (one inserted card read mode).

A status register 13 sequentially stores the detection signals of the weight detection switch 6 and the card detection switch 7 as status (S0-S3 in FIG. 3). When the card weight 4 is put off the hopper 5 or put on the hopper 5, the status of the switch 6 changes. When the cards are stacked in the hopper 5 or a card is inserted in the hopper 5, the status of the switch 7 changes. The sequentially changing status of the switches 6 and 7 are supplied to the processor 20 from the register 21 and the immediately previous status is read from the status register 13 and supplied to the processor 20.

The processor 20 detects the signals from the mode switch 24 and the start switch 25 and detects the transition of the status based on the status from the register 21 and the status register 13, as shown in FIGS. 3 and 4 to be explained later. This is carried out by an internal program of the processor 20.

A timer 14 monitors the transition of the status. For example, it measures a transition time between the status S2 and S3 in FIG. 3c. If the processor 20 detects that the transition time is longer than a predetermined time period t, it instructs an error process.

The processor 20 controls the card drive unit 2 based on the transition of the status. To this end, the processor 20 produces a sequential control signal, which is temporarily loaded to a control register 22 and thence sent to the card drive unit 2 through the instruction line 10. Based on the control signal, the card drive unit 2 controls the rotation and the stop of the feed roller 3.

Referring to FIGS. 3 and 4, the operation of FIGS. 1 and 2 is explained.

Figure 3A:
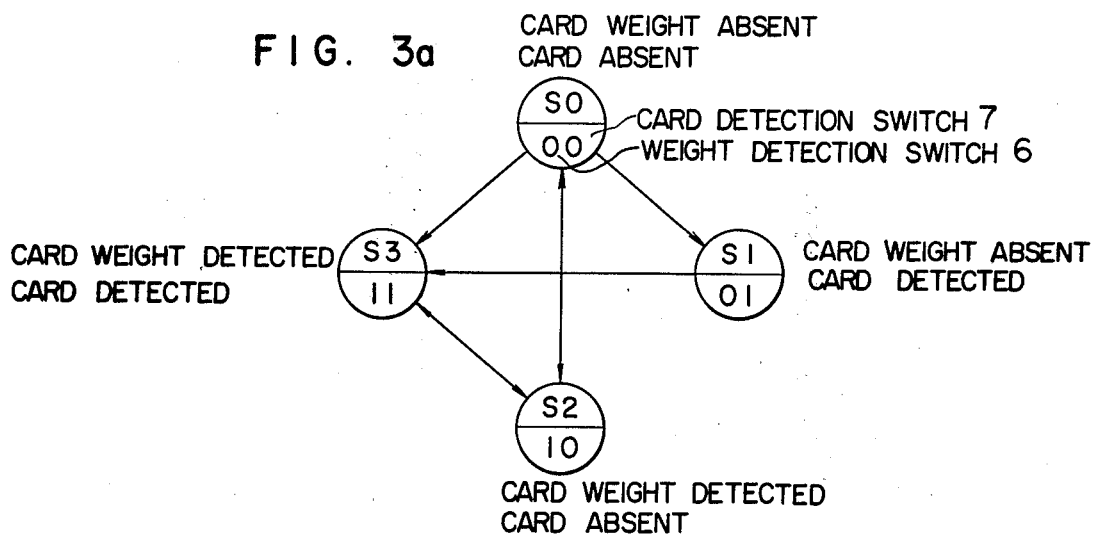
FIGS. 3a to 3d show status transition charts of card and weight detected by a card detection switch and a weight detection switch.

Before describing the operations in the respective modes (FIGS. 3a-3d), the respective status are first explained with reference to FIG. 3a. The status are determined by the detection signals of the weight detection switch 6 and the card detection switch 7. For example, when the card weight 4 is absent and the card is also absent, the status is 0 (S0) and a status signal "00" is loaded to the switch register 21, thence it is sent to the processor 20. Similarly, when the card weight 4 is absent and the card is detected, the status is 1 (S1) and a status signal "01" is sent to the processor 20. When the card weight 4 is detected and the card is absent, the status is 2 (S2) and a status signal "10" is sent to the processor 20. When the card weight 4 and the card are detected, the status is 3 (S3) and a status signal "11" is sent to the processor 20.

Figure 3B:
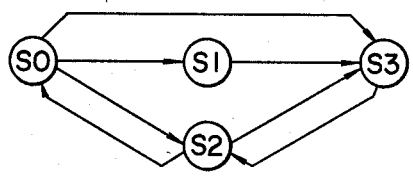

On a premise that those status occur and transit, the operation in the sequential read mode of FIG. 3b is explained. In this mode, an operator stocks more than one cards (usually a number of cards) in the hopper 5 and puts the card weight 4 on the card stack, at this moment, the status has already shifted to the status 3. In a certain case, depending on the manner of stacking the cards, the weight detection switch 6 is temporarily turned on during the course of the shift from the status S0 to the status S3 and the card detection switch 7 changes from the off status (status 2) to the status 3. The transitions of the status are sequentially stored in the status register 13. Under this condition, or after the mode switch 24 is set to the sequential read mode (terminal A), the start switch 25 is depressed and the processor 20 provides the control signal to the control register 22 based on the signals from the switches 24 and 25 and the status signals from the register 21 and the status register 13, to control the card drive unit 2, which in turn drives the feed roller 3. The cards are sequentially fed to the reading station 8 where the information is read, and the cards are then accommodated in the stacker 9. As the cards in the hopper have gone out, only the card weight 4 is detected and the status 3 (S3) transits to the status 2 (S2). When the control unit 1 detects the S2, the rotation of the feed roller 3 is stopped by the card drive unit 2.

Figure 3C:
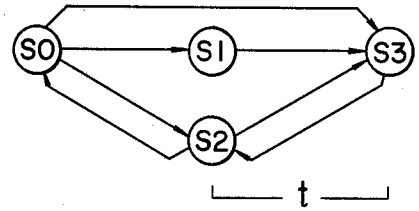

The one card out of stack read mode shown in FIG. 3c is now explained. The mode selection switch 24 is connected to the one card read mode (terminal B) so that each time when the start switch 25 is depressed the cards stacked in the hopper 5 are sequentially fed to the reading station 8 one at a time and the lowermost card first.

Referring to FIG. 1, when the card is inserted in a reading port shown by an arrow a while the card weight 4 is put on the hopper 5, the card detection switch 7 is turned on by the card and the control unit 1 detects the insertion of the card. The weight detection switch 6 is kept on so long as the card weight 4 is set in the hopper 5. The status of the switches 6 and 7 is stored in the status register 13 in the control unit 1. When the status of the switches 6 and 7 changes, the control unit 1 sends a control signal to the card drive unit 2 through the instruction line 10 to drive the feed roller 3 in accordance with the combination of the current status and the immediately previous status. As the feed roller 3 rotates, the card having been partially inserted is automatically pulled in and the data on the card is read when the card passes through the reading station 8, and the data is sent to the control unit 1 through a readout data line 11.

The cards read at the reading station 8 are accommodated in the stacker 9 and the rotation of the feed roller 3 is stopped by an instruction from the program of the control unit 1. The subsequent read operation repeats the operation starting from the insertion of the card.

Referring to FIG. 3c, in the status S0 in which neither the card nor the card weight 4 is present in the hopper 5, a number of cards are set in the hopper 5. Depending on the manner of setting the cards, the cards first contact to the weight detection switch 6 (the switch 6 turns on) while the cards have not yet contacted to the card detection switch 7. In this case, the status transits to the status S2 and when the cards thereafter contact to the card detection switch 7, the switch 7 is turned on and the status transits to the status S3. Conversely, if the cards first contact to the card detection switch 7 and then contact to the weight detection switch 6, the status temporarily assumes the status S1 and then transits to the status S3. Under this condition, the card weight 4 is put on the card stack. Then, each time when the start switch 25 is depressed, the cards are fed to the reading station 8 one at a time and the lowermost card first. The transition of the status in the one card out of stack read mode is basically S0→S3 and the status S1 and S2 are present on the way for very small time periods.

In order to distinguish the present one card out of stack read mode from the single inserted card read mode to be explained later by the above status transition, it is necessary to discriminate the mode of the transition S2→S3. The transition time for the transition S2→S3 is measured by the timer 14 and if it is within the predetermined time period it is assumed that the status S2 has not occured and it is assumed as the setting step of the cards to the hopper 5.

When the status transits to S3 and if the immediately previous status is S0, it is the one card out of stack read mode and the feed roller 3 is driven by the depression of the start switch 25. If the immediately previous state is S2, it is the single inserted card read mode and the feed roller 3 is driven to pull in the card when the status transits to S3.

Figure 3D:
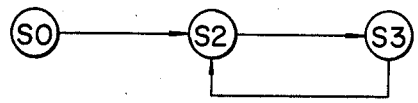

The single inserted card read mode shown in FIG. 3d is now explained. The mode switch 24 is connected to the single card read mode (terminal B). The single inserted card read mode accompanies with the operation of inserting the cards to the hopper 5 one at a time and feeding the inserted card to the reading station 8. In this mode, the card weight 4 is set in the hopper 5 and hence the weight detection switch 6 is on and the status has transited from S0 to S2. Under this condition, when the cards are inserted one at a time, the card detection switch 7 is turned on and the status transits to S3. As described above, when the status transits to S3, the one card out of stack read mode and the single inserted card read mode are distinguished by the immediately previous status. In the present case, since the immediately previous status is S2, the start switch 25 need not be depressed each time when the card is to be fed as required in the one card out of stack read mode but the card need only be inserted to the hopper 5 and the card detection switch 7 detects the insertion of the card so that the feed roller 3 is rotated to feed the card to the reading station 8. Thus, each time when the card is inserted, the transition between the status S2 and the status S3 is repeated. In this manner, the cards are read by inserting the cards to the hopper 5 one at a time.

While the preferred embodiment of the present invention has been explained, the present invention is not limited to the illustrated embodiment but may be embodied in various forms.

Figure 5:
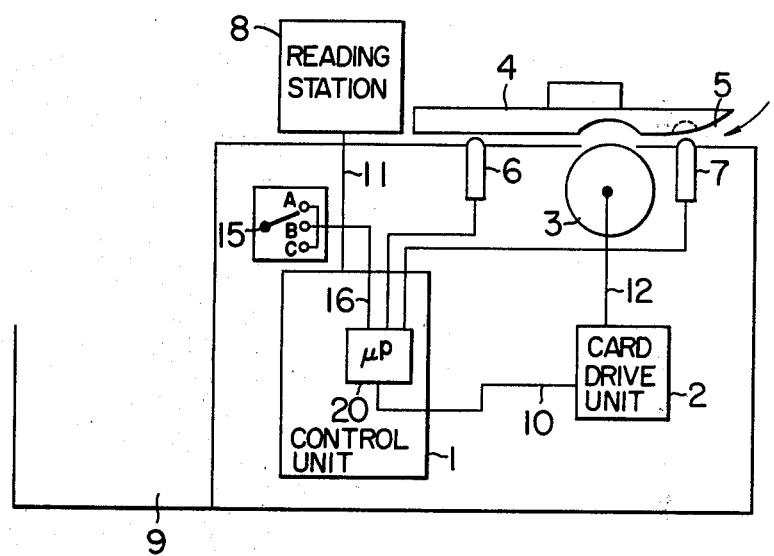
FIG. 5 shows a schematic diagram of a card reading apparatus in accordance with another embodiment of the present invention.

FIG. 5 shows a card reading apparatus in accordance with another embodiment. A basic difference from the embodiment of FIG. 1 resides in that the control unit 1 has no timer 14 and no status register 13. Instead, a mode selection switch 15 for selecting the sequential read mode (terminal A), the one card out of stack read mode (terminal B) and the single inserted card read mode (terminal C) and a signal wire for transmitting the mode signal from the mode switch 15 to the processor 20 are provided. For the sake of convenience, the registers in FIGS. 1 and 2 and the start switch 25 are omitted.

In the embodiment of FIG. 1, the timer 14 for monitoring the transition time from the status S2 to the status S3 and the status register 13 for storing the immediately previous status are required to distinguish the one card out of stack read mode and the single inserted card read mode. In the embodiment of FIG. 5, the discrimination between the one card out of stack read mode and the single inserted card read mode is effected by the terminals B and C of the mode selection switch 15. When the mode selection switch 15 selects the sequential read mode (terminal A), the operation is same as that described above.

I claim:

1. A card reading apparatus for reading information recorded on a card, comprising:
   (a) a hopper in which cards are accommodated or inserted,
   (b) a card weight disposed on said hopper or the cards stacked in said hopper,
   (c) a feed roller for feeding the cards stacked or inserted in said hopper, p1 (d) roller drive means for driving said feed roller,
   (e) read means for reading information on the cards fed from said hopper,
   (f) card detection means for detecting the presence or absence of the card in said hopper,
   (g) weight detection means for detecting the presence or absence of the card weight in said hopper,
   (h) mode selection means for selecting a sequential read mode or a single card read mode for a card read mode of said read means,
   (i) memory means for storing detection signals of said card detection means and said weight detection means as status signals, and
   (j) processing means for determining a mode setting signal from said mode selection means and determining transition of mode and an immediately previous status when the status transits based on information from said card detection means, said weight detection means and said memory means and further determining if a transition time from a first status to a second status is within a predetermined time period and if a status immediately previous to the second status is the first status in order to discriminate a one card out of stack read mode and a single inserted card read mode and provide a control signal to said roller drive means in accordance with the discriminated mode.

2. A card reading apparatus according to claim 1 further comprising a timer for measuring the transition time from the first status to the second status.

3. A card reading apparatus according to claim 1 further comprising a start switch for causing the cards to be fed to said reading means one at a time for each depression of said start switch.

4. A A card reading apparatus for reading information recorded on a card, comprising;
   (a) a hopper in which cards are accommodated or inserted,
   (b) a card weight disposed on said hopper or the cards stacked in said hopper,
   (c) a feed roller for feeding the cards stacked or inserted in said hopper,
   (d) roller drive means for driving said feed roller,
   (e) read means for reading information on the cards fed from said hopper,
   (f) card detection means for detecting the presence or absence of the card in said hopper,
   (g) weight detection means for detecting the presence or absence of the card weight in said hopper,
   (h) a mode selection switch for selecting a sequential read mode, a one card out of stack read mode or a single inserted card read mode for a card read mode in said read means, and
   (i) processing means for determining a mode setting means from said mode selection switch and determining a status based on signals from said card detection means and said weight detection means in order to provide a control signal to said roller drive means in accordance with the selected mode and the status.

* * * * *